United States Patent
Ando et al.

(10) Patent No.: US 7,427,946 B2
(45) Date of Patent: Sep. 23, 2008

(54) OBJECT SENSING APPARATUS

(75) Inventors: Hiroyuki Ando, Wako (JP); Masahito Shingyoji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 11/401,753

(22) Filed: Apr. 10, 2006

(65) Prior Publication Data

US 2006/0227037 A1 Oct. 12, 2006

(30) Foreign Application Priority Data

Apr. 12, 2005 (JP) ............ P.2005-114612

(51) Int. Cl.
*G01S 7/40* (2006.01)
*G01S 13/32* (2006.01)
*G01S 13/93* (2006.01)
*G01S 13/08* (2006.01)

(52) U.S. Cl. ............ 342/173; 342/70; 342/118; 342/128; 342/165; 342/175; 342/195

(58) Field of Classification Search ........ 342/27, 342/28, 70–72, 165–175, 195, 118, 128–133, 342/192–194, 196–197; 180/167–169; 701/300, 701/301

See application file for complete search history.

(56) References Cited

U.S. PATENT DOCUMENTS

| | | | | |
|---|---|---|---|---|
| 5,325,097 | A * | 6/1994 | Zhang et al. | 342/71 |
| 6,278,399 | B1 * | 8/2001 | Ashihara | 342/173 |
| 6,369,747 | B1 * | 4/2002 | Ashihara | 342/70 |
| 6,414,623 | B1 * | 7/2002 | Ashihara | 342/70 |
| 6,414,628 | B1 * | 7/2002 | Ashihara | 342/173 |
| 6,611,227 | B1 * | 8/2003 | Nebiyeloul-Kifle et al. | 342/173 |
| 6,825,799 | B2 * | 11/2004 | Isaji | 342/173 |
| 6,831,595 | B2 * | 12/2004 | Isaji | 342/173 |
| 7,057,550 | B1 * | 6/2006 | Aker | 342/174 |

FOREIGN PATENT DOCUMENTS

| | | |
|---|---|---|
| JP | A-04-105086 | 4/1992 |
| JP | 3488610 | 6/1999 |
| JP | A-11-166973 | 6/1999 |
| JP | A-2001-166035 | 6/2001 |
| JP | A-2004-264258 | 9/2004 |

* cited by examiner

*Primary Examiner*—Bernarr E Gregory
(74) *Attorney, Agent, or Firm*—O'Melveny & Myers LLP

(57) ABSTRACT

While an FM-CW mode for sensing an object, in which a frequency of an electromagnetic wave transmitted from a transmission/reception antenna 6 is continuously modulated, and also, a CW mode for judging an abnormal condition, in which the frequency of the electromagnetic wave to be transmitted from the transmission/reception antenna 6 is not modulated are switched, an abnormal condition judging section judges an abnormal condition when a signal level of a reception signal of the FM-CW mode is smaller than, or equal to a first judging threshold value, and also, a signal level of a reception signal in the CW mode is smaller than, or equal to a second judging threshold value which is higher than the first judging threshold value.

6 Claims, 5 Drawing Sheets

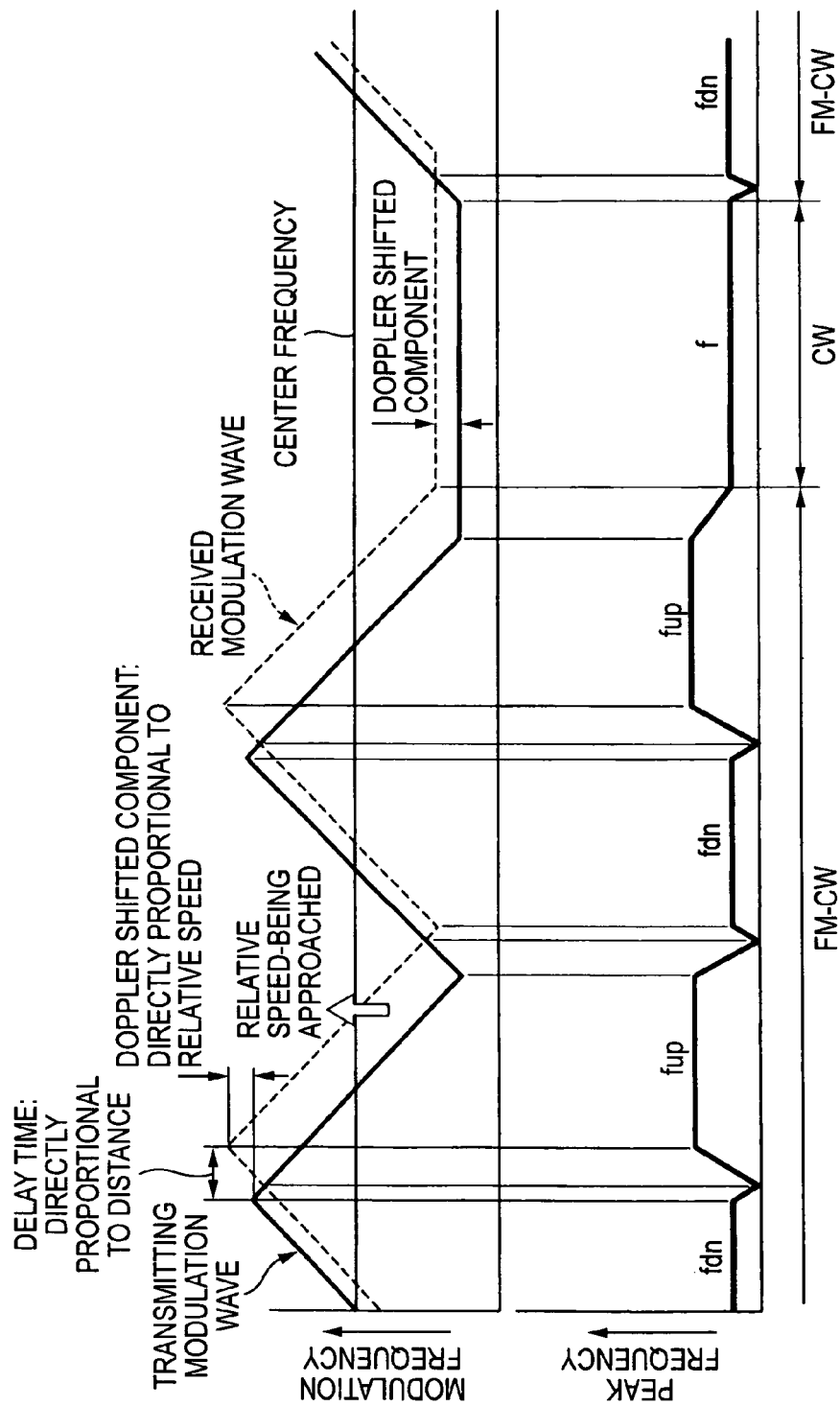

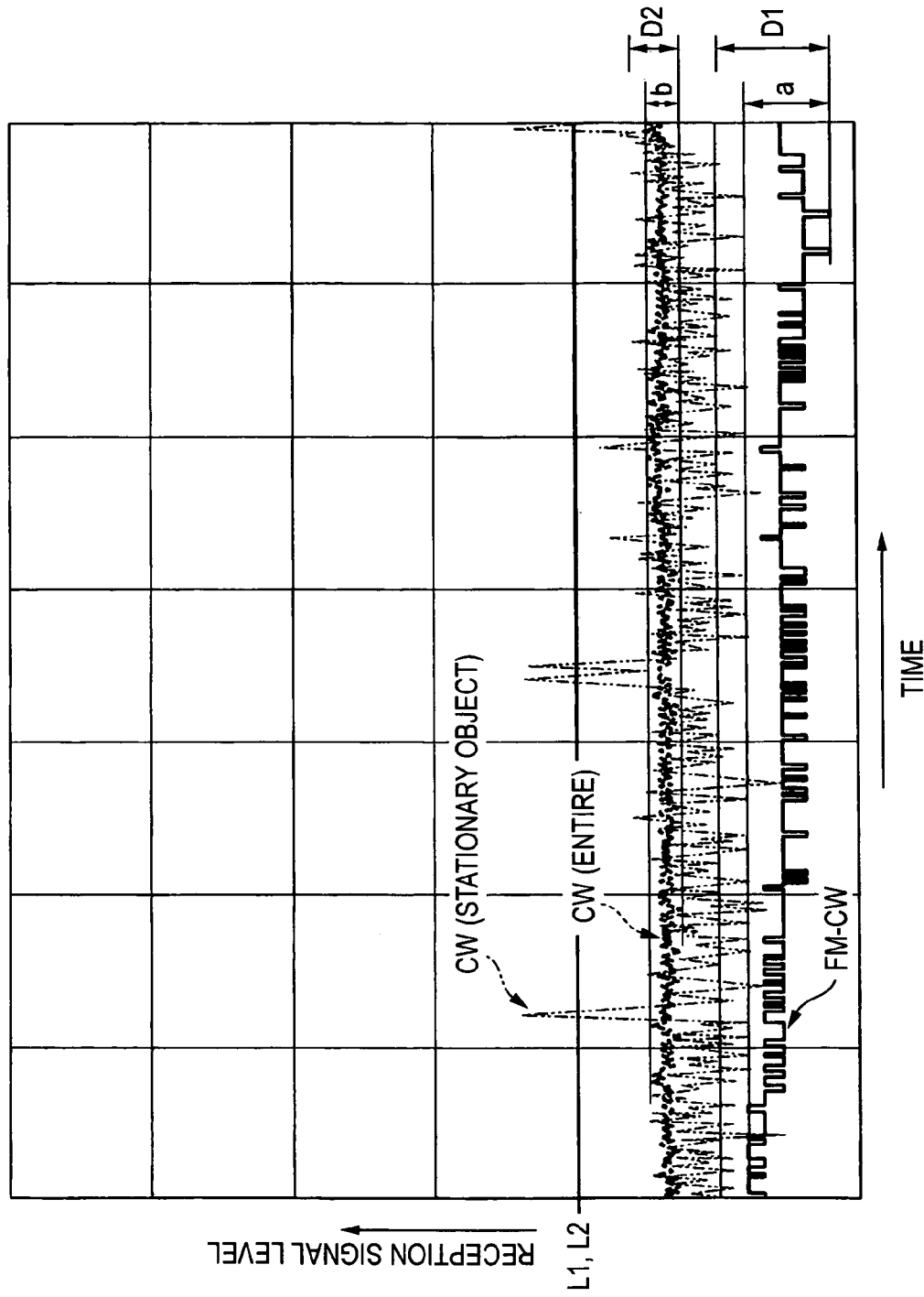

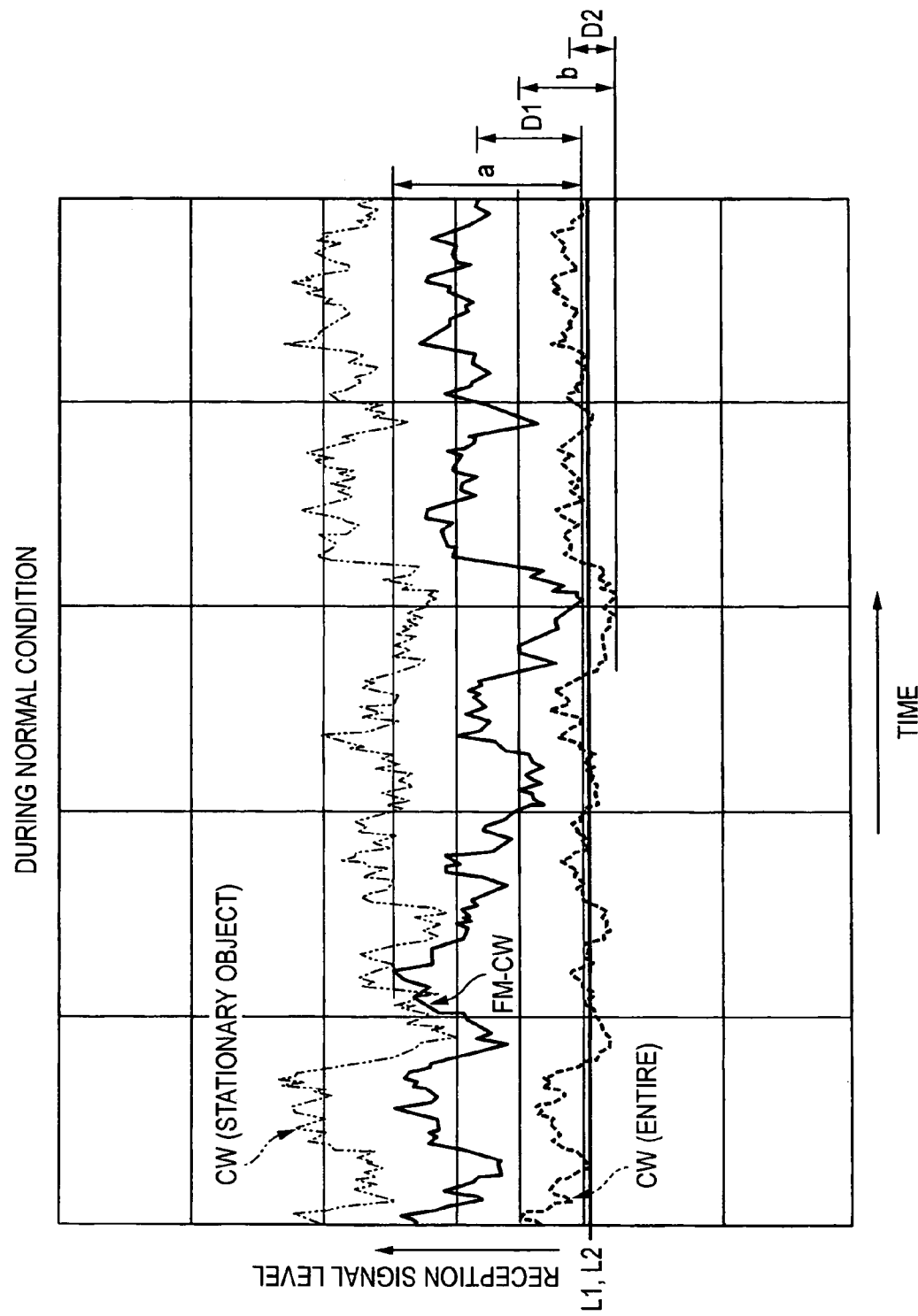

OBJECT SENSING APPARATUS

BACKGROUND OF THE INVENTION

The present invention is related to an object sensing apparatus for sensing an object by employing FM-CW waves.

A radar apparatus capable of switching an FM-CW mode and a CW mode is known from the below-mentioned patent publication 1. In the FM-CW mode, FM-CW waves are transmitted, and the FM-CW waves are produced by increasing/decreasing a frequency of CW waves in a triangular wave form in accordance with a time elapse. In the CW mode, CW waves are transmitted which are not frequency-modulated. This known radar apparatus senses preceding-driven vehicles and the like in the FM-CW mode during normal operation, whereas when the sensing operation as to the preceding-driven vehicles and the like by using the FM-CW mode cannot be carried out since snow and mud are attached, the radar apparatus senses a road surface and objects located on the road side by using the CW mode. Then, when the radar apparatus judges that a sensing operation by using the FM-CM mode can be again carried out based upon a sensing result obtained in the CW mode, the radar apparatus restarts to sense preceding-driven vehicles and the like by using the FM-CW mode.

[Patent Publication 1]

Japanese Patent No. 3488610

On the other hand, in the radar apparatus described in the above-described patent publication 1, while the preceding-driven vehicles and the like are sensed in accordance with the FM-CW mode, when signal levels of reflection waves are lowered, so that the preceding-driven vehicle and the like cannot be sensed, this radar apparatus judges an abnormal condition. However, if the abnormal condition is judged based upon only the signal levels of the reflection waves acquired in the FM-CW mode, then the sufficiently high judging precision can not be obtained. Thus, there are some possibilities that although the sensing function of the FM-CW mode is still left, the radar apparatus judges an abnormal condition, and also, although the sensing function is lost, the radar apparatus judges the normal condition.

SUMMARY OF THE INVENTION

The present invention is made to solve the above-described problem, and therefore, has an object to judge an abnormal condition in high precision by an object sensing apparatus for sensing an object in an FM-CW mode.

To achieve the above-explained object, according to the aspect 1 of the present invention, there is provided with an object sensing apparatus including: transmission/reception section (6) for transmitting an electromagnetic wave to a predetermined region and for receiving a reflection wave of the transmitted electromagnetic wave reflected from an object; object sensing section (15) for sensing the object based upon a reception signal received by the transmission/reception section (6); and abnormal condition judging section (16) for judging an abnormal condition based upon a signal level of the reception signal received by the transmission/reception section (6), wherein the transmission/reception section (6) is capable of switching an FM-CW mode in which a frequency of an electromagnetic wave to be transmitted can be continuously modulated, and a CW mode in which the frequency of the electromagnetic wave to be transmitted is not modulated, and the abnormal condition judging section (16) judges an abnormal condition based upon a signal level of a reception signal in the FM-CW mode and a signal level of a reception signal in the CW mode.

Further, according to the aspect 2 of the present invention, there is provided with the object sensing apparatus as in the aspect 1, wherein the abnormal condition judging section (16) judges the abnormal condition, when the signal level of the reception signal of the FM-CW mode is smaller than or equal to a first judging threshold value (L1), and the signal level of the reception signal in the CW mode is smaller than or equal to a second judging threshold value (L2).

Further, according to the aspect 3 of the present invention, there is provided with the object sensing apparatus as in the aspect 2, wherein the first judging threshold value (L1) of the signal level of the reception signal in the FM-CW mode and the second judging threshold value (L2) of the signal level of the reception signal in the CW mode are different values from each other.

Further, according to the aspect 4 of the present invention, there is provided with the object sensing apparatus as in the aspects 2 or 3, wherein the first judging threshold value (L1) of the signal level of the reception signal in the FM-CW mode is smaller than the second judging threshold value (L2) of the signal level of the reception signal in the CW mode.

Further, according to the aspect 5 of the present invention, there is provided with the object sensing apparatus as in the aspect 1, wherein the abnormal condition judging section (16) judges the abnormal condition, when a difference between a maximum value and a minimum value of the signal level of the reception signal in the FM-CW mode is smaller than or equal to a third judging threshold value (D1), and a difference between a maximum value and a minimum value of the signal level of the reception signal in the CW mode is smaller than or equal to a fourth judging threshold value (D2).

It should be understood that the transmission/reception antenna 6 of an embodiment corresponds to the transmission/reception section of the present invention.

According to the arrangement of the aspect 1 of the present invention, while switching the FM-CW mode in which the frequency of the electromagnetic wave to be transmitted from the transmission/reception section is continuously modulated and also the CW mode in which the frequency of the electromagnetic wave to be transmitted from the transmission/reception section is not modulated, the abnormal condition judging section judges the abnormal condition based upon the signal level of the reception signal in the FM-CW mode and the signal level of the reception signal in the CW mode. As a consequence, the judging precision can be improved, as compared with that of such a case that the abnormal condition is judged based upon only the signal level of the reception signal in the FM-CW mode, or only the signal level of the reception level in the CW mode.

According to the arrangement of the aspect 2 of the present invention, the abnormal condition judging section judges the abnormal condition when the signal level of the reception signal of the FM-CW mode is smaller than, or equal to the first judging threshold value, and also, the signal level of the reception signal in the CW mode is smaller than, or equal to the second judging threshold value.

According to the arrangement of the aspect 3 of the present invention, since the first judging threshold value of the signal level of the reception signal in the FM-CW mode and the second judging threshold value of the signal level of the reception signal in the CW mode are different values from each other, the abnormal condition can be properly judged, as compared with that of such a case that the same judging threshold value is applied to the signal level of the reception signal in the FM-CW mode and the signal level of the reception signal in the CW mode.

According to the arrangement of the aspect 4 of the present invention, since the first judging threshold value of the signal level of the reception signal in the FM-CW mode is smaller than the second judging threshold value of the signal level of the reception signal in the CW mode, such a problem may be avoided that although the function of the FM-CW mode for sensing the object is operable under normal condition, since the function of the CW mode for judging the abnormal condition is lost, it is so judged that the abnormal condition occurs.

According to the arrangement of the aspect 5 of the present invention, the abnormal condition judging section judges the abnormal condition when the difference between the maximum value and the minimum value of the signal level of the reception signal in the FM-CW mode is smaller than, or equal to the third judging threshold value, and also, the difference between the maximum value and the minimum value of the signal level of the reception signal in the CW mode is smaller than, or equal to the fourth judging threshold value. As a consequence, such an erroneous judging operation can be avoided that although the object sensing apparatus is operated under normal condition, the abnormal condition judging section judges the occurrence of the abnormal condition thereof.

BRIEF DESCIPTION OF THE DRAWINGS

FIGS. 2A and 2B are diagrams for representing waveforms and peak frequencies of transmission/reception waves when an object is approached with respect to a transmission/reception antenna.

FIG. 4 is a graph for indicating signal levels of reflection waves during abnormal condition.

FIG. 5 is a graph for representing signal levels of reflection waves during normal condition.

DETAILED DESCRIPTION OF THE PREFERRED EMBODIMENTS

Next, embodiment modes of the present invention will now be described based upon embodiments of the present invention shown in accompanying drawings.

Figure 1:
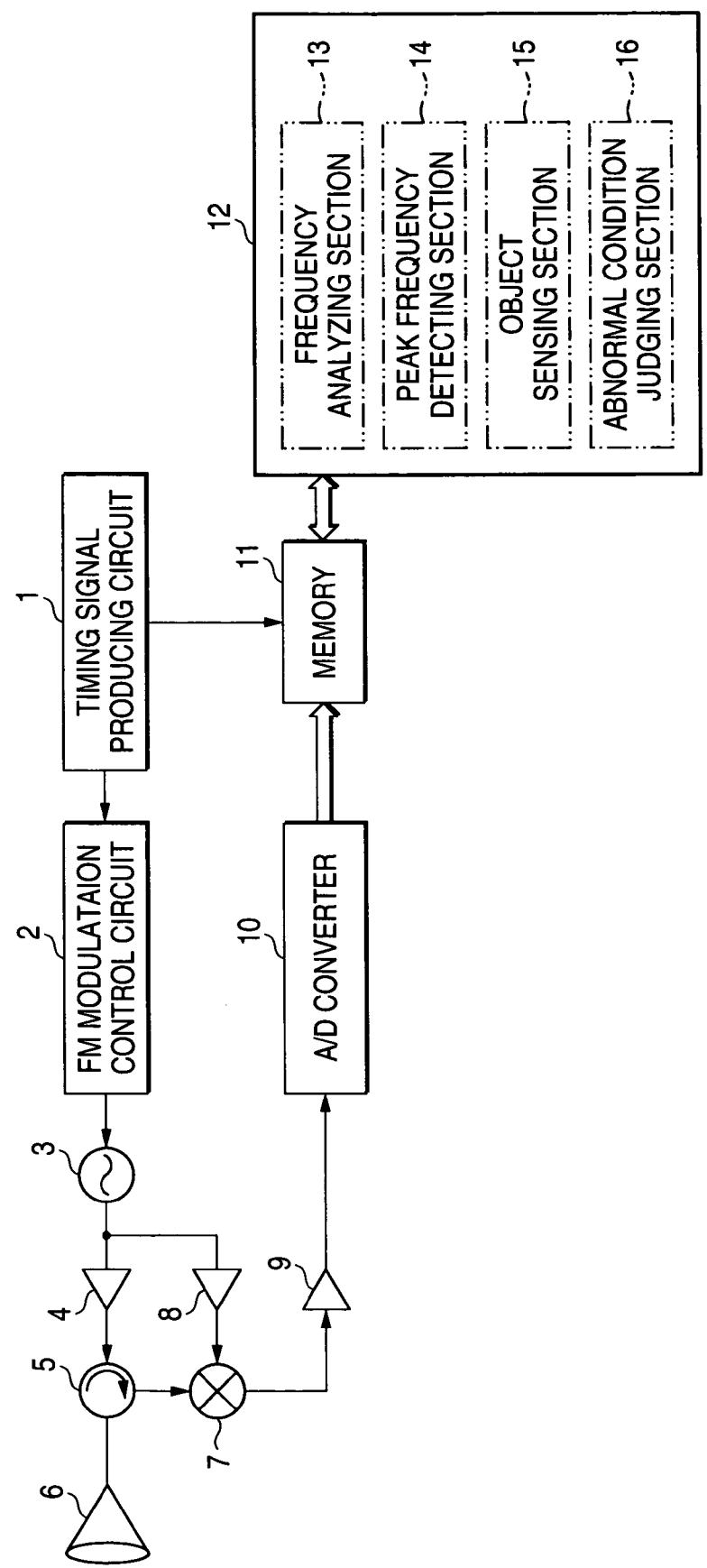
FIG. 1 is a block diagram for indicating an arrangement of an object sensing apparatus.

FIGS. 1 to 5 indicate an object sensing apparatus according to an embodiment of the present invention. FIG. 1 is a block diagram for representing an arrangement of the object sensing apparatus. FIGS. 2A and 2B are diagrams for representing waveforms and peak frequencies of transmission waves and of reception waves when an object is moved to be approached to a transmission/reception antenna. FIGS. 3A and 3B are diagrams for indicating peaks which are detected by a peak detecting section of the object sensing apparatus. FIG. 4 is a graph for representing signal levels of reflection waves when an abnormal condition is sensed. FIG. 5 is a graph for showing signal levels of reflection waves when a normal condition is sensed.

Firstly, in FIG. 1, oscillating operation of an oscillator 3 are modulated and controlled by an FM modulation control circuit 2 based upon a timing signal inputted from a timing signal producing circuit 1, a frequency of a transmission signal is modulated in a triangular wave form as indicated by a solid line of FIG. 2A, the modulated transmission signal derived from the oscillator 3 is inputted via an amplifier 4 and a circulator 5 to a transmission/reception antenna 6 functioning as a transmission/reception section, and thus, FM-CW waves are transmitted from the transmission/reception antenna 6. The FM modulation controlling circuit 2 modulates a frequency of a transmission signal in a triangular wave form only for a predetermined time period, and thereafter, does not modulate the frequency of the transmission signal for a subsequent predetermined time period, and thus, CW waves having a constant frequency are transmitted from the transmission/reception antenna 6 for the latter-mentioned predetermined time. In other words, in the object sensing apparatus of this embodiment, the FM-CW mode and the CW mode are switched for every predetermined time.

When an object such as a preceding-driven vehicle is present in front of the transmission/reception antenna 6, reflection waves which are reflected from the object are received by the transmission/reception antenna 6. For example, in such a case that the preceding object is approached to the own vehicle, reflection waves appear as indicated by a broken line of FIG. 2A; on an ascent side where the transmission waves are linearly increased, the reflection waves appear at a lower frequency than the frequency of the transmission waves and are delayed from the transmission waves; and on a descent side where the transmission waves are linearly decreased, the reflection waves appear at a higher frequency than the frequency of the transmission waves and are delayed from the transmission waves.

Reception waves received from the transmission/reception antenna 6 are entered via the circulator 5 to a mixer 7. While a transmission signal distributed from the transmission signal outputted from the oscillator 3 is entered via the amplifier 8 in addition to the reception waves from the circulator 5, the transmission waves are mixed with the reception waves by the mixer 7. As a result, as represented in FIG. 2B, in a time period during which reflection waves of the FM-CW waves are received, such a beat signal having a peak frequency "$f_{up}$" is produced on the ascent side where the transmission waves are linearly increased, and such a beat signal having a peak frequency "$f_{dn}$" is produced on the descent side where the transmission waves are linearly decreased, whereas in a time period during which reflection waves of CW waves are received, a beat signal having a constant peak frequency "f" is produced.

The beat signals obtained by the mixer 7 are amplified by the amplifier 9 so as to obtain necessary signal levels, and then, the amplified beat signals are A/D-converted by an A/D converter 10 for every sampling time, and thereafter, amplified digital beat data are stored in a memory 11 in a time sequential manner. While the timing signal is inputted from the timing signal producing circuit 1 to the memory 11, the memory 11 stores and holds thereinto the data in such a separate manner in response to the timing signal, namely, on the ascent side where the frequency of the transmission/reception waves is increased, and on the descent side where the frequency of the transmission/reception waves is decreased.

The data held by the memory 11 is entered to the CPU 12, and then, the CPU 12 performs a calculation process operation with respect to the entered input.

The CPU 12 is equipped with a frequency analyzing section 13, a peak frequency detecting section 14, an object sensing section 15, and an abnormal condition judging section 16.

The frequency analyzing section 13 frequency-analyzes data of a beat signal which has been stored in the memory 11 so as to acquire a spectrum distribution of the beat signal data. As a method of the frequency analysis, the FFT (Fast Fourier Transformation) is employed.

First, a description is made of a function of the FM-CW mode of the object sensing apparatus according to the embodiment.

Figure 3A:
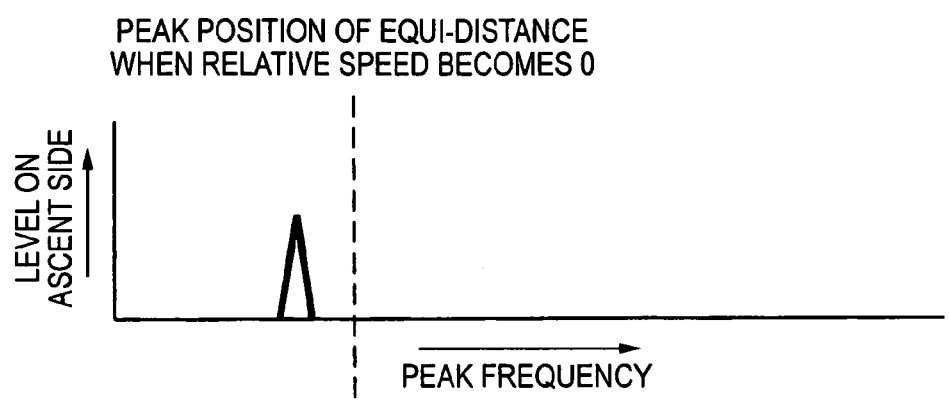
FIGS. 3A and 3B are diagrams for showing peaks detected by a peak detecting section.
Figure 3B:
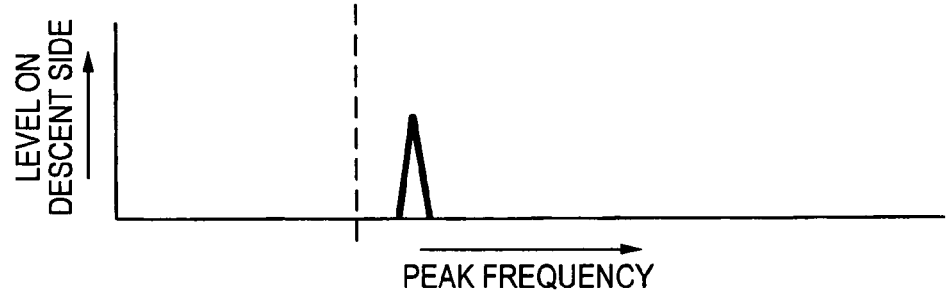

The peak frequency detecting section 14 detects such a spectrum (peak spectrum) that a spectrum level becomes a maximal value when this spectrum level is larger than, or equal to a predetermined value based upon spectrum data acquired by the frequency analysis by the frequency analyzing section 13. In order to detect such a peak spectrum, the following judging operation is carried out. That is, for example, when a level of a spectrum larger than, or equal to the predetermined threshold value, if spectrum levels of frequencies higher and lower than the frequency of this detected spectrum level represent that the trend of the spectrum levels is inverted from an increase trend to a decrease trend, then it is so judged that this spectrum corresponds to the above-explained peak spectrum. Accordingly, a peak spectrum on the ascent side as shown in FIG. 3A and a peak spectrum on the descent side of indicated in FIG. 3B are detected by the peak frequency detecting section 14 in such a manner that both these peak spectra sandwich a peak position of an equi-distance when a relative speed with respect to an object becomes "0."

The object sensing section 15 can calculate both a distance and a relative speed between an object and the own object sensing apparatus based upon the peak frequency "$f_{up}$" on the ascent side and the peak frequency "$f_{dn}$" on the descent side, which are detected by the peak frequency detecting section 14. Also, the object sensing section 15 performs another calculating operation. That is, in the case that as to a plurality of object, peak frequencies "$f_{up}$" and "$f_{dn}$" on both the ascent side and the descent side are detected by the peak frequency detecting section 14, the object sensing section 15 executes a process operation for defining combined peak frequencies as to the peak frequencies "$f_{up}$" and "$f_{dn}$" of the ascent side and the descent side, and then, calculates a distance and a relative speed as to such an object having the combined peak frequencies "$f_{up}$" and "$f_{dn}$" which have been finally defined.

In this case, the peak frequency "$f_{up}$" on the ascent side of the transmission waves and the peak frequency "$f_{dn}$" on the decent side thereof are expressed by the following first formula and second formula, respectively, assuming now that an FM modulation width is "$\Delta f$", light velocity is "$c$", a modulation repetition period is "$T_m$", a distance up to the object is "$r$", a transmission center frequency is "$f_0$", and a relative speed with respect to the object is "$v$".

$$f_{up} = (4 \cdot \Delta f \cdot r)/(c \cdot T_m) + \{(2 \cdot f_0)/c\} \cdot v \quad (1)$$

$$f_{dn} = (4 \cdot \Delta f \cdot r)/(c \cdot T_m) + \{(2 \cdot f_0)/c\} \cdot v \quad (2)$$

The distance "$r$" up to the object and the relative speed "$v$" are calculated in accordance with the below-mentioned third formula and fourth formula if the first formula and the second formula are satisfied.

$$r = (c \cdot T_m) \cdot (f_{up} + f_{dn})/(8 \cdot \Delta f) \quad (3)$$

$$v = c \cdot (f_{up} - f_{dn})/(4 \cdot f_0) \quad (4)$$

That is to say, both the distance "$r$" and the relative speed "$v$" are obtained based upon the peak frequency "$f_{up}$" on the ascent side and the peak frequency "$f_{dn}$" on the descent side.

In contrast to the above-described FM-CW mode, in the CW mode of the object sensing apparatus, a relative speed "$v$" with respect to an object can be calculated based upon the frequency "f" corresponding to a Doppler shift component of FIG. 2. However, in this embodiment, since the CW mode is employed so as to judge an abnormal condition, only signal levels of reflection waves may cause a problem.

In graphs of FIGS. 4 and 5, a solid line indicates a signal level of a reflection wave of the FM-CW mode; a broken line shows a signal level of an entire reflection wave of the CW mod; and a chain line indicates a signal level of a reflection wave reflected from a stationary object such as a road-sided object within the reflection waves of the CW mode. FIG. 4 is a graph for showing such an abnormal condition that snow and mud are attached to the object sensing apparatus. FIG. 5 is a graph for representing a normal condition of the object sensing apparatus.

As apparent from a compression result between FIGS. 4 and 5, both the signal levels of the reflection waves in the FM-CW mode and the CW mode are lowered in the abnormal condition of FIG. 4, as compared with the normal condition of FIG. 5. As a consequence, the signal levels of the reflection waves in both the FM-CW mode and the CW mode are compared with predetermined judging threshold values, so that the object sensing apparatus can judge the abnormal condition. In this embodiment, a first judging threshold value "L1" for the signal level of the reflection wave in the FM-CW mode, and a second judging threshold value "L2" for the signal level of the reflection wave in the CW mode have been set to the same values (for instance, −60 dB).

Under the normal operation shown in FIG. 5, both the signal level (see solid line) of the reflection wave in the FM-CW mode and the signal level (see chain line) of the reflection wave of the stationary object in the CW mode completely exceed the first judging threshold value "L1" and the second judging threshold value "L2" corresponding thereto. Under the abnormal operation shown in FIG. 4, both the signal level (see sold line) of the reflection wave in the FM-CW mode and the signal level (see chain line) of the reflection wave of the stationary object in the CW mode are almost smaller than, or equal to the first judging threshold value "L1" and the second judging threshold value "L2" corresponding thereto. As a consequence, when the signal level of the reflection wave in the FM-CW mode becomes smaller than, or equal to the first judging threshold value "L1", and further, the signal level of the reflection wave of the stationary object in the CW mode becomes smaller than, or equal to the second judging threshold value "L2", the abnormal condition judging section 16 can judge the abnormal condition of the object sensing apparatus.

It should also be noted that even during the normal condition, signal levels may instantaneously become smaller than, or equal to the first and second judging threshold values due to an influence caused by noise, and the like. As a result, while a vehicle is driven for a predetermined time, or over a preselected distance, times when the signal levels become smaller than, or equal to the judging threshold values are counted. Then, in the case that the counted time exceeds a preset time, the abnormal condition of the object sensing apparatus is judged.

As previously explained, while the FM-CW mode for sensing the object and the CW mode for judging the malfunction are switched, when the signal level of the reception signal in the FM-CW mode becomes smaller than, or equal to the first judging threshold value "L1", and further, the signal level of the reception signal in the CW mode becomes smaller than, or equal to the second judging threshold value "L2", the abnormal condition is judged. As a result, an occurrence of erroneous judging operation can be largely reduced, as compared with that of such a case that the abnormal condition is judged by employing only one of the FM-CW mode and the CW mode.

On the other hand, the following fact can be seen. That is, a difference "a" between a maximum value and a minimum value of the signal level (see solid line) of the reflection wave in the FM-CW mode, and also, a difference "b" between a maximum value and a minimum value of the signal level (see broken line) of the entire reflection wave in the CW mode in the graph of FIG. 4, namely during the abnormal condition, are extremely small, as compared with those of FIG. 5 during the normal condition. As a consequence, if such an abnormal condition judging item that while the vehicle is driven for a predetermined time, or the vehicle is driven for a preselected distance, the difference "a" between the maximum value and the minimum value of the signal level (see solid line) of the reflection wave in the FM-CW mode becomes smaller than, or equal to a third judging threshold value "D1", and also the difference "b" between the maximum value and the minimum value of the signal level (see broken line) of the entire reflection wave in the CW mode becomes smaller than, or equal to a fourth judging threshold value "D2" is added to another abnormal condition judging item in the AND gating condition, then an erroneous judging operation of the abnormal condition can be furthermore avoided.

In other words, the abnormal condition judging section 16 may alternatively judge the abnormal condition of the object sensing apparatus when both the signal level of the reflection wave in the FM-CW mode and the signal level of the entire reflection wave in the CW mode become smaller than, or equal to the first judging threshold value L1 and the second judging threshold value L2; the difference "a" between the maximum value and the minimum value of the signal level of the reflection wave in the FM-CW mode becomes smaller than, or equal to the third judging threshold value D1; and further, the difference "b" between the maximum value and the minimum value of the signal level of the entire reflection wave in the CW mode becomes smaller than, or equal to the third judging threshold value D2.

While the embodiments of the present invention are described in detail, the present invention is not limited only to the above-described embodiments, but may be modified in various ways without departing from the present invention described in the scope of claims.

For instance, the first judging threshold value L1 and the second judging threshold value L2 have been set to the same values in the above-explained embodiment. Alternatively, the first judging threshold value L1 of the signal of the reception signal in the FM-CW mode and the second judging threshold value L2 of the signal level of the reception signal in the CW mode may be set to different values. More specifically, if the first judging threshold value L1 is set to be lower than the second judging threshold value l2, then such a problem may be avoided that although the function of the FM-CW mode for sensing the object is operable under normal condition, since the function of the CW mode for judging the abnormal condition is lost, it is so judged that the abnormal condition occurs.

Alternatively, the transmission/reception section may be arranged by a transmission antenna and a reception antenna.

What is claimed is:

1. An object sensing apparatus comprising:
    transmission/reception section for transmitting an electromagnetic wave to a predetermined region and for receiving a reflection wave of the transmitted electromagnetic wave reflected from an object;
    object sensing section for sensing the object based upon a reception signal received by the transmission/reception section; and
    abnormal condition judging section for judging an abnormal condition based upon a signal level of the reception signal received by the transmission/reception section, wherein
    the transmission/reception section is adapted to switch between an FM-CW mode in which a frequency of an electromagnetic wave to be transmitted is continuously modulated, and a CW mode in which the frequency of the electromagnetic wave to be transmitted is not modulated; and
    the abnormal condition judging section judges an abnormal condition based upon a signal level of a reception signal in the FM-CW mode and a signal level of a reception signal in the CW mode.

2. The object sensing apparatus as claimed in claim 1, wherein the abnormal condition judging section judges the abnormal condition, when the signal level of the reception signal of the FM-CW mode is lees than or equal to a first judging threshold value, and the signal level of the reception signal in the CW mode is less than or equal to a second judging threshold value.

3. The object sensing apparatus as claimed in claim 2, wherein the first judging threshold value of the signal level of the reception signal in the FM-CW mode and the second judging threshold value of the signal level of the reception signal in the CW mode are different values from each other.

4. The object sensing apparatus as claimed in claim 3, wherein the first judging threshold value of the signal level of the reception signal in the FM-CW mode is less than the second judging threshold value of the signal level of the reception signal in the CW mode.

5. The object sensing apparatus as claimed in claim 2, wherein the first judging threshold value of the signal level of the reception signal in the FM-CW mode is less than the second judging threshold value of the signal level of the reception signal in the CW mode.

6. The object sensing apparatus as claimed in claim 1, wherein the abnormal condition judging section judges the abnormal condition, when a difference between a maximum value and a minimum value of the signal level of the reception signal in the FM-CW mode is less than or equal to a third judging threshold value, and a difference between a maximum value and a minimum value of the signal level of the reception signal in the CW mode is less than or equal to a fourth judging threshold value.

* * * * *